United States Patent [19]

Speth

[11] 3,874,019

[45] Apr. 1, 1975

[54] WINDSHIELD WIPER ADAPTER

[76] Inventor: Peter J. Speth, 239-25 88th AVe., Bellerose, N.Y. 11426

[22] Filed: Sept. 7, 1973

[21] Appl. No.: 395,215

[52] U.S. Cl......... 15/250.32, 15/250.35, 15/250.41, 15/250.42
[51] Int. Cl............................. B60s 1/28, B60s 1/40
[58] Field of Search ............. 15/250.2, .21, .23, .27, 15/.31, .32, .35, .36, .41, .42

[56] References Cited
UNITED STATES PATENTS

| | | | |
|---|---|---|---|
| 1,775,231 | 9/1930 | Waggoner et al. | 15/250.2 X |
| 1,938,840 | 12/1933 | Klevin | 15/250.32 |
| 2,265,266 | 12/1941 | Cote | 15/250.41 |
| 2,324,365 | 7/1943 | Coutts | 15/250.32 X |
| 2,605,491 | 8/1952 | Williams | 15/250.32 |
| 2,607,944 | 8/1952 | Turner et al. | 15/250.32 X |

FOREIGN PATENTS OR APPLICATIONS
958,121  5/1964  United Kingdom........... 15/250.35

Primary Examiner—Peter Feldman
Attorney, Agent, or Firm—Blum Moscovitz Friedman & Kaplan

[57] ABSTRACT

An adapter is provided for securing two parallel spaced windshield wiper blades upon a single driving arm to assure effective wiping. Means are provided to allow the arm pressure to be substantially equally divided between the two wiper blades. The equal pressure is effective in maintaining sufficient blade to windshield contact to assure effective wiping action regardless of the windshield being wiped.

12 Claims, 14 Drawing Figures

PATENTED APR 1 1975 3,874,019
SHEET 1 OF 4
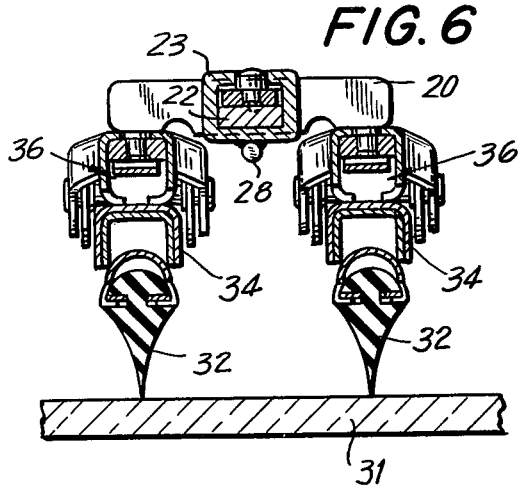
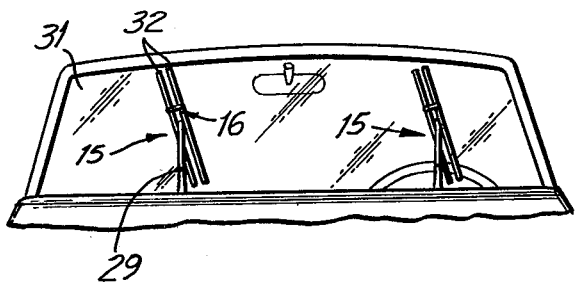
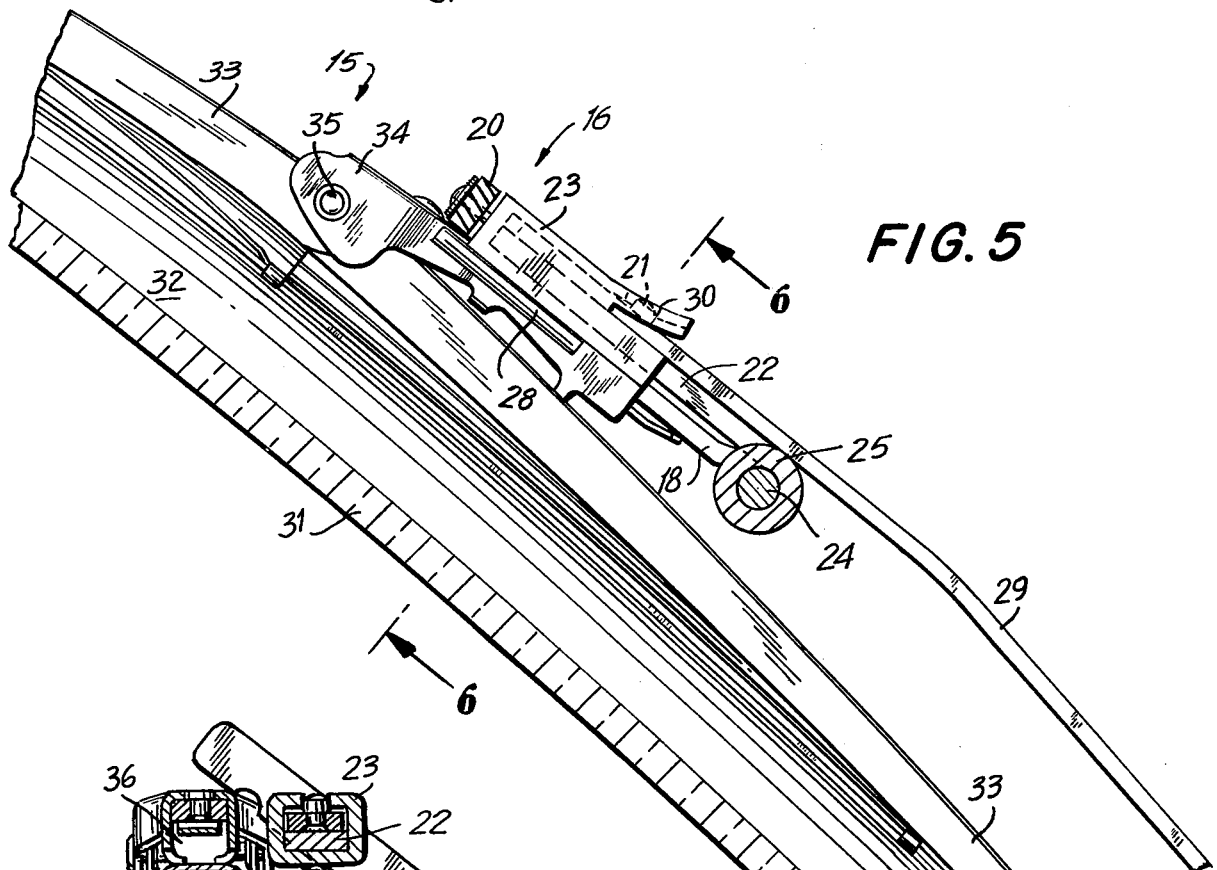
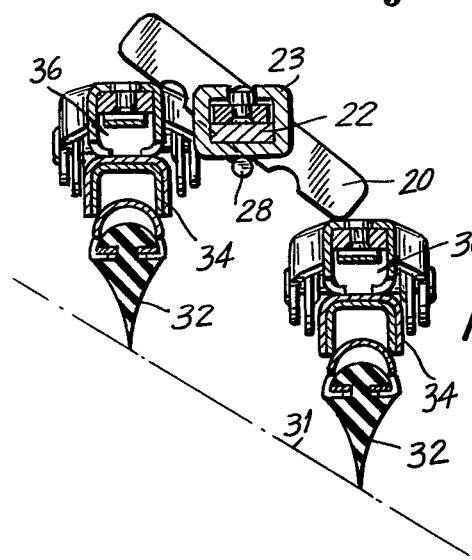

WINDSHIELD WIPER ADAPTER

BACKGROUND OF THE INVENTION

This invention relates generally to an adapter for use with a windshield wiper driving arm and especially to an adapter for providing improved wiping performance by mounting two parallel wiper blades on a single windshield wiper driving arm. A disadvantage of conventional wiper blades is apparent when a rain fall begins. The failure to quickly remove dirt and film on the windshield thus causing smearing thereon is encountered because of the curved shape of the windshield and the failure of the wiper blade to conform to the contour of the windshield. As the wiper blade sweeps across the windshield, portions thereof do not make intimate contact with the windshield, thus providing cleaning that is less than completely satisfactory.

SUMMARY OF THE INVENTION

Generally speaking, in accordance with the invention, an adapter is provided for mounting two parallel spaced windshield wiper blades on a single driving arm. The adapter is formed of a receiving portion for mounting the adapter onto the driving arm and is further provided with two engaging portions for engaging wiper blades and fixing the same in parallel relationship. A swivel means is also provided which evenly applies pressure to both wiper blades regardless of the position of the wiper blades on the curved windshield during wiping.

Accordingly, it is an object of this invention to provide a windshield wiper assembly capable of providing improved cleaning of a windshield.

Another object of the invention is to provide an adapter for fixably securing two wiper blades in parallel and mounting the same to a conventional wiper arm.

A further object of the invention is to provide an improved adapter having means thereon to allow total arm pressure to be substantially equally divided between two parallel wiper blades during wiping.

Still other objects and advantages of the invention will in part be obvious and will in part be apparent from the specifications.

The invention accordingly comprises the features of construction, combinations of elements and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a front view of an automobile windshield including wiper assemblies embodying the instant invention;

FIG. 5 is a partial sectional view taken along line 5—5 of FIG. 4;

FIG. 6 is a partial sectional view taken along line 6—6 of FIG. 5;

FIG. 7 is an alternative view of the assembly illustrated in FIG. 6 in a second operative position;

DESCRIPTION OF THE PREFERRED EMBODIMENTS

Referring now to FIG. 1, there is illustrated therein a windshield wiper assembly, generally indicated at 15, disposed upon the windshield 31 of a car. The assembly is comprised of two standard windshield wipers 32 mounted to a drive arm 29 by an adapter 16.

Figure 2:
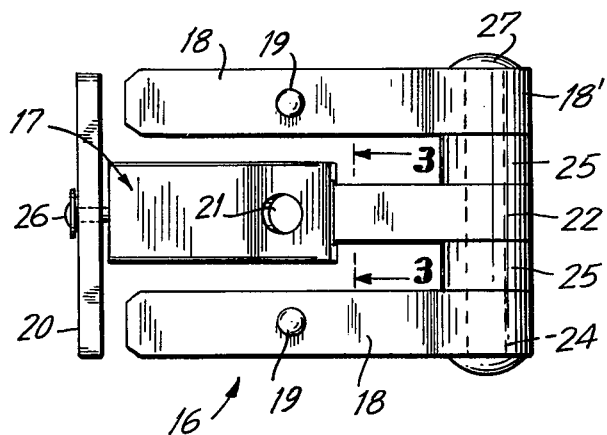
FIG. 2 is a top plan view of the windshield wiper adapter constructed in accordance with a preferred embodiment of the instant invention.
Figure 3:
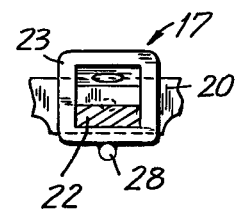
FIG. 3 is a partial sectional view taken along line 3—3 of FIG. 2.
Figure 4:
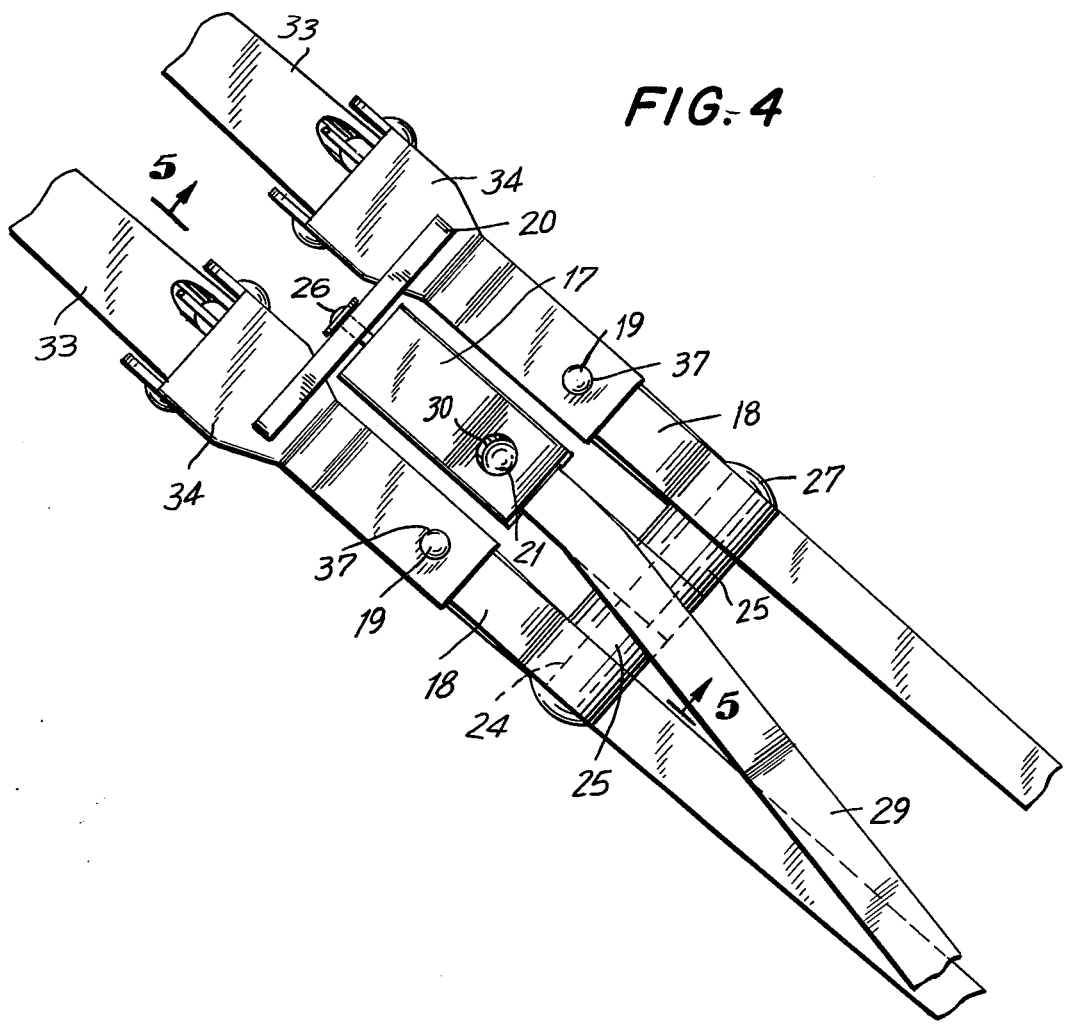
FIG. 4 is a plan view of a windshield wiper assembly including the adapter illustrated in FIG. 2.

Referring now to FIGS. 2 and 3, an adapter 16 is illustrated. The adapter 16 includes a receiving portion 17, having a swivel bridge 20 coupled thereto, and two blade engaging portions 18, both the receiving portion 17 and the blade engaging portions 18 being rotatably secured to axle 24. The receiving portion 17, and the blade engaging portions 18 are formed, as is hereinafter discussed, to correspond to wiper blade engaging portions of driving arms and receiving portions of wiper blades of the insertable variety currently used on many automobiles.

The receiving portion 17 is defined by a housing 23 formed like a sleeve, having a rectangular cross-section, and a flange 22 which flange is secured at a first end to the bottom wall of housing 23. The second end of the flange 22 is formed of a loop configuration and is disposed about axle member 24 to provide for rotation of receiving portion 17 about axle 24.

Each blade engaging portion 18 is formed of an elongated flange member and includes a loop 18' at one end to rotatably dispose the blade engaging portion 18 about axle 24. Spacers 25 are disposed on axle 24 between receiving portion 17 and engaging portions 18 in order to maintain a separation therebetween and prevent displacement of the members during rotation about axle 24. The ends of axle 24 are headed as at 27 to secure the members onto the axle. Swivel bridge 20 is an elongated arm and is secured to receiving portion 17 by a pin 26 which provides a pivot for swivel bridge 20. An elongated bar 28 is secured to the bottom wall of housing 23 and extends out past receiving member 17 and under the swivel bridge 20 to constrain the extent of rotation of swivel bridge 20.

Referring now to FIGS. 4 through 7, a windshield wiper assembly including adapter 16 is therein illustrated. The adapter 16 is secured to a standard drive arm 29 by inserting the drive arm into the opening formed by housing 23 of the receiving portion. The drive arm 29 includes a protuberance 30 formed thereon which protuberance is engaged in the aperture 21 formed in housing wall 23 of the receiving portion 17 and further aids in securing the drive arm 29 in the receiving portion 18.

The windshield wipers are of known construction and are formed of a wiper blade 32, a wiper blade carrier 33, and carrier bracket 34. The carrier bracket 34 is pivotally coupled at a first end 35 to wiper blade carrier 33 and includes a receiving portion 36 which receiving portion is formed substantially the same as the housing 23 of blade receiving portion 17. Thus, as is understood by the skilled artisan, blade engaging portions 18 are inserted into the receiving portion 36 of carrier brackets 34 to secure the carrier brackets 34 to the blade engaging portions 18. The protuberances 19 formed on the blade engaging portions 18 are secured in the apertures 37 formed in carrier brackets 34. As the wiper blades 32 rest upon the windshield 31, the swivel bridge 20 is pivotally disposed against both carrier brackets 34.

In operation, drive arm 29 will wipe the wiper blades 32 across the windshield 31 in a sweeping back and forth motion as is well known with wiping pressure being applied by the usual spring (not shown). As the wiper blades 32 are swept across the windshield, the windshield and the friction drag will cause the leading blade to tilt (see FIGS. 6 and 7). The swivel bridge 20 which rotatably contacts the carrier brackets 34 will be rotated by the leading blade as it is tilted as shown in FIG. 7 and will thus force the trailing blade into firmer contact with the windshield and hence, a more effective cleaning thereof.

Figure 9:
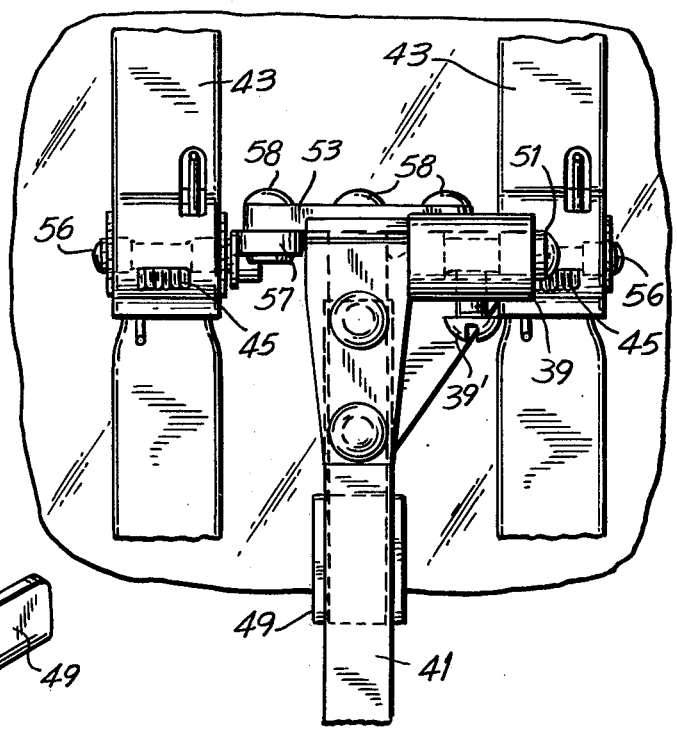
FIG. 9 is a partial plan view of a windshield wiper assembly including the adapter illustrated in FIG. 8.
Figure 8:
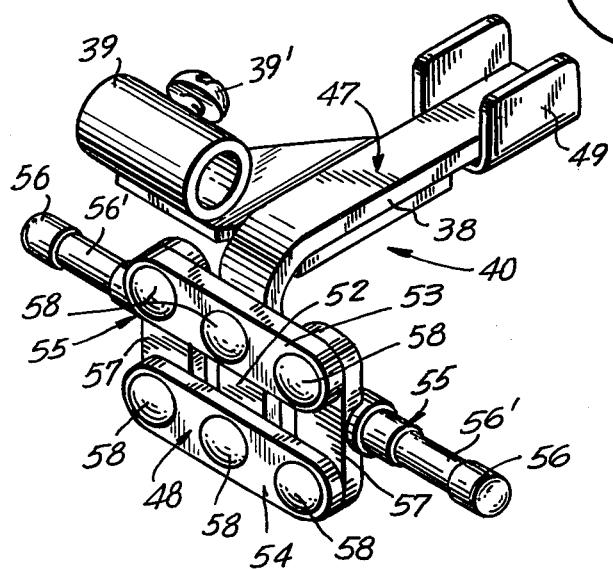
FIG. 8 is a perspective view of an adapter constructed in accordance with an alternate embodiment of the instant invention.
Figure 10:
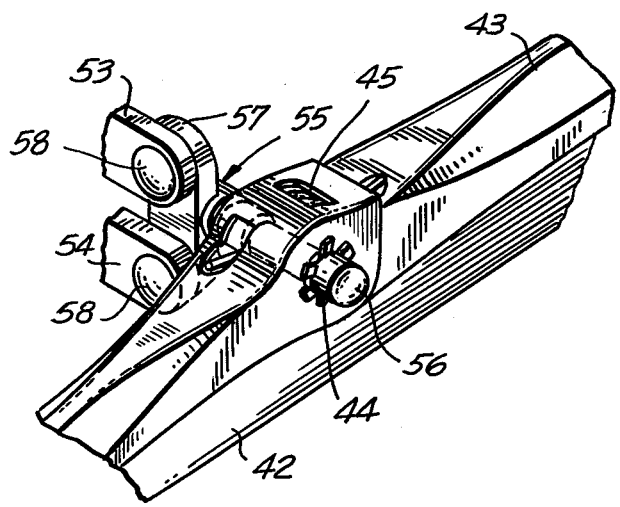
FIG. 10 is a partial perspective view, at an enlarged scale, of the windshield wiper assembly of FIG. 9.

An alternate embodiment of the present invention is illustrated in FIGS. 8 through 10 wherein an adapter, generally indicated at 40 is distinguished from the adapter in FIGS. 1 through 7 in its adaptation for use with windshield wiper blades and drive arms of the plug-in variety. A windshield wiper blade of the plug-in variety includes a blade 42, a carrier 43, a passage 44 through carrier 43, and a spring 45 disposed within the carrier 43 and around the passage 44 to provide releasable securing means for plug 56. The drive arm 41 is formed with a plug portion 51 which is mounted to the end of the drive arm and has the plug pointed in a direction perpendicular to the lengthwise extension of the drive arm. Plug portion 51 has a narrower portion intermediate the ends thereof which aids in securing the adapter thereto as will hereinafter be discussed. Such drive arms are currently standard on some automobiles.

The adapter 40 includes drive arm securing portion 47 and swivel bridge assembly 48. The drive arm securing portion 47 is formed of an angle support 38, a plug receptacle 39 mounted to said angle support 38 and a channel shaped drive arm carrier 49 mounted to the angle support at one end thereof. The drive arm 41, including the plug portion 51 secured thereto is inserted into the plug receptacle 39 and is secured in the receptacle by a screw 39' and is further secured by the drive arm securing portion 47 to the adapter 40, with the drive arm cradled in carrier 49. The angle support 38 is further defined by a depending portion 52 which portion is perpendicular to the lengthwise direction of the drive arm and provides the support for the remaining operative elements of the adapter 40.

The swivel bridge assembly 48 is formed of two bridge elements 53 and 54 which elements are pivotally joined in spacedapart relationship by pins 58 at their centers to depending portion 52 of angle support 38. Pins 58 pivotally join plug members 55 to bridge elements 53 and 54 to form a parallelogram configuration. The plug members 55 are formed of two portions, a plug 56 and a support arm 57 which arm is coupled to the bridge elements 53 and 54 as hereinabove discussed. Plugs 56 projects outwardly in a plane which is perpendicular to the lengthwise direction of the drive arm 47, and are formed to include a portion 56' of reduced diameter so as to be insertably engaged in the passage 44 formed in the carrier 43 to thereby secure the wipers 42 on the plugs 56.

In operation the same result is obtained as with the embodiment disclosed in FIGS. 2 through 7. The leading wiper blade is tilted during wiping and rotates the parallelogram linkage to force the edge of the trailing wiper blade into better engagement with the windshield to provide better contact and more efficient cleaning of the windshield.

Figure 11:
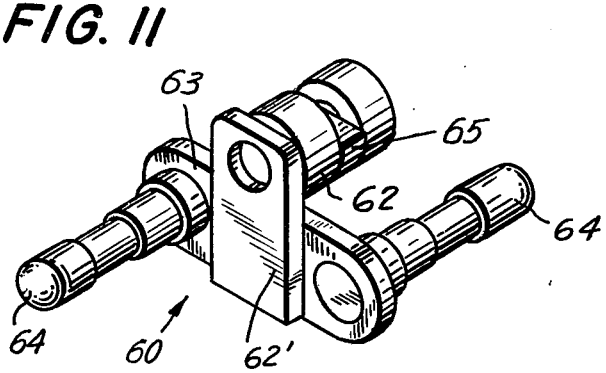
FIG. 11 is a perspective view of an adapter constructed in accordance with another alternate embodiment of the instant invention.
Figure 12:
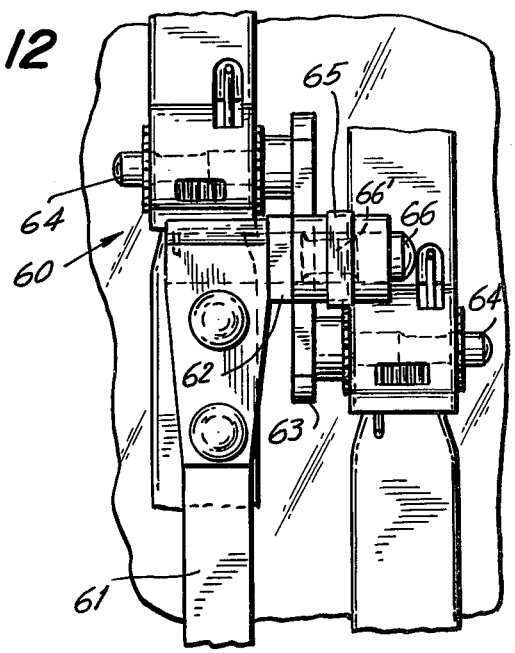
FIG. 12 is a partial plan view of a windshield wiper assembly including the adapter illustrated in FIG. 11.

Another embodiment of the present invention is illustrated in FIGS. 11 and 12 wherein an adapter 60 is illustrated for joining two spaced apart parallel wiper blades of the plug-in variety to a driving arm 61 also of the plug-in variety. The adapter 60 is formed of a plug receiving portion 62 which portion includes support 62', a cross piece 63 mounted to said support 62' and plug members 64 disposed perpendicular to the cross piece 63 and mounted at opposite the ends thereof. The plug receiving portion 62 is formed as a tube having a portion thereof cut away to allow a spring clasp 65 to be inserted therein. The adapter 60 is rotatably engaged on a plug 66 which plug is part of the drive arm and includes a recessed portion 66' thereon. The spring clasp 65 secures the recessed portion 66' to adapter 60. Standard plug-in wiper blades, as discussed with reference to FIGS. 8 through 10, are mounted on the plug members 64, and the wiper assembly is operated in the same manner and derives the same benefits as illustrated in the above embodiments.

Figure 13:
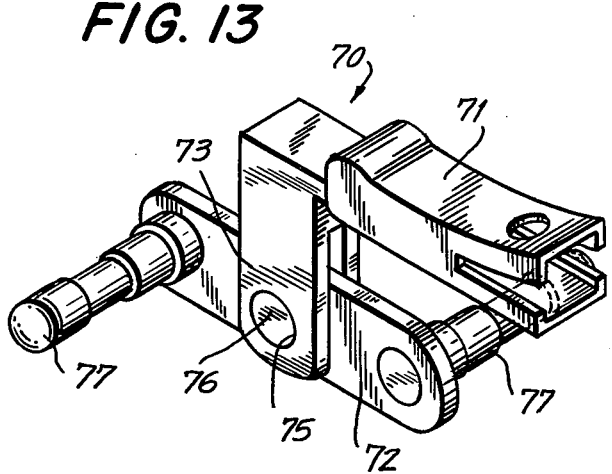
FIG. 13 is a perspective view of an adapter constructed in accordance with still another alternate embodiment of the instant invention.
Figure 14:
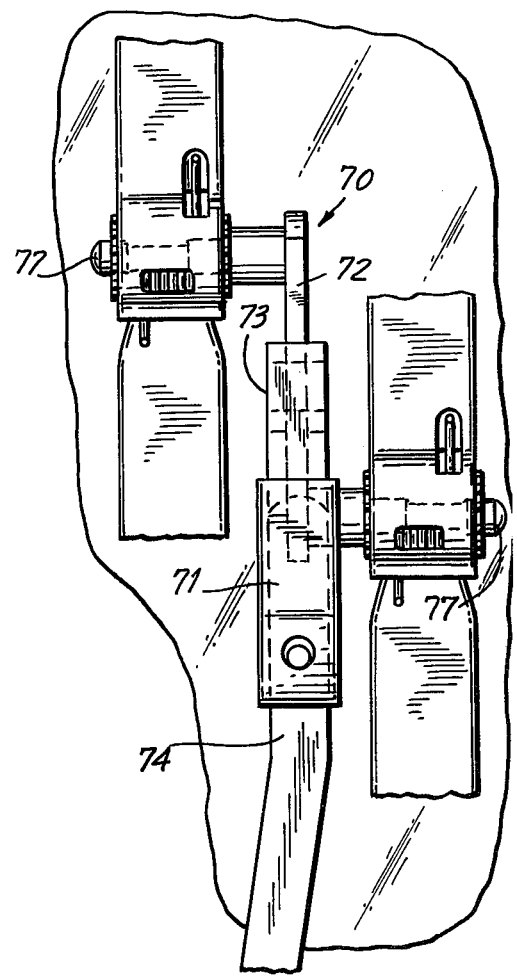
FIG. 14 is a partial plan view of a windshield wiper assembly including the adapter illustrated in FIG. 13.

Still another alternate embodiment of the present invention is illustrated in FIGS. 13 and 14 wherein an adapter 70 is illustrated which adapter is provided for securing two wiper blades of a plug-in variety onto a drive arm of the insertable variety. The adapter 70 includes a drive arm receiving portion 71 and a swivel bridge 72 pivotally mounted thereon. The first end of the receiving portion 71 is the same as is illustrated above in FIGS. 2 through 7 and secures a drive arm 74 in receiving portion 71 in the same manner as hereinabove described. The portion away from the drive arm is characterized by two extended bridge supports 73 which supports include aligned apertures 75 formed therein which extend in a direction perpendicular to the direction of the receiving portion 71.

Swivel bridge 72 is formed of an elongated member and includes an aperture 75 formed in the center. The swivel bridge 72 is mounted by a pin 76 passed through apertures 75 to pivotally secure swivel bridge 72 to bridge supports 73. Both ends of swivel bridge 72 include plug members 77 facing in opposite directions. Each plug members 77 is adapted to have disposed thereon a windshield wiper blade carrier of the plug-in variety such as is illustrated in FIGS. 8 through 10. Wiper blades are placed upon the pin members 77 and the operation of the wiper blade assembly is the same as heretofore described in the other above mentioned embodiments.

It is understood that each of the adapters disclosed herein may be used with either a pin member drive arm or an insertable drive arm as illustrated herein. Moreover, various swivel combinations are contemplated and are not so limited by their failure to be discussed in the above mentioned disclosure. With the adapters of the present invention, the standard arms currently used can have two blades mounted thereon or an adapter can be permanently mounted on a wiper arm for carrying dual blades. With dual blades, wiping action is substantially improved thereby greatly enhancing visibility in a rain storm with resultant improvements in safety.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An adapter for supporting two wiper blades on a windshield wiper drive arm comprising wiper blade engaging means for removably disposing two wiper blades on said drive arm in parallel relationship, said wiper blade means including a central arm through which said wiper blade engaging means is mounted on said drive arm, said wiper blade engaging means including swivel means for pivotally mounting each of said wiper blades with respect to said drive arm and for applying contact pressure to said wiper blades, said swivel means further including a pair of arms spaced on opposite sides of said central arm and a pivot pin pivotally mounting said pair of arms with respect to said central arm, and a swivel bridge pivotally mounted to said central arm and adapted to overlie said wiper blades.

2. An adapter as claimed in claim 1 wherein said wiper blade engaging means includes means for removably mounting said wiper blade engaging means on said drive arm.

3. An adapter as claimed in claim 1 wherein said wiper blade engaging means includes a central arm through which said wiper blade's engaging means is mounted on said drive arm and said swivel means includes a pair of arms spaced on opposite sides of said central arm and a pivot pin pivotally mounting said pair of arms with respect to said central arm.

4. An adapter for supporting two wiper blades on a windshield wiper drive arm comprising wiper blade engaging means for removably disposing two wiper blades on said drive arm in parallel relationship, said wiper blade engaging means including a central portion engageable with said drive arm, depending arm means depending from said central portion and a pair of posts carried by said depending arm means through which said blades are pivotally mounted, said wiper blade engaging means further including swivel means for pivoting each of said wiper blades with respect to said drive arm and for applying contact pressure to said wiper blades.

5. An adapter as claimed in claim 4 wherein said pair of posts is mounted to said depending arm means through a parallelogram linkage.

6. An adapter as claimed in claim 4 wherein said pair of posts is mounted to said depending arm means through a cross link.

7. An adapter as claimed in claim 6 wherein said cross link is pivoted to said depending arm means through a pivot pin.

8. An adapter for fastening two wiper blades to a windshield wiper drive arm comprising mounting means engageable with said wiper blades and drive arm for positioning said wiper blades in parallel relationship with respect to one another, said mounting means including means for pivotally mounting each of said wiper blades to pivot about axes substantially perpendicular to both said wiper blades, said mounting means mounting one said blade with respect to the other said blade for independent movement in parallel planes substantially normal to the surface of the windshield, and for preventing movement of one of said blades during wiping action from lifting or adversely affecting the other of said blades from wiping engagement with a curved windshield surface.

9. An adapter for fastening two wiper blades to a windshield wiper drive arm as claimed in claim 8 wherein said mounting means further includes contact pressure means for maintaining substantially equal contact pressure between said blades and the windshield surface regardless of the location of said blades in the wiping cycle.

10. An adapter for supporting two wiper blades on a windshield wiper drive arm comprising wiper blade engaging means for removably disposing two wiper blades on said drive arm in parallel relationship, said wiper blade engaging means including pivoting means for pivotally mounting each of said wiper blades to pivot about axes substantially perpendicular to both said wiper blades and swivel means for evenly applying contact pressure between said wiper blades and a windshield.

11. An adapter as claimed in claim 10, wherein said wiper blade engaging means includes means for removably mounting said wiper blade engaging means on said drive arm.

12. An adapter as claimed in claim 10, wherein said wiper blade engaging means includes a central arm to which said wiper blade's engaging means is mounted to said drive arm and said pivoting means includes a pair of arms spaced on opposite sides of said central arm and a pivot pin pivotally mounting said pair of arms with respect to said central arm.

* * * * *